United States Patent [19]

Jongeling

[11] Patent Number: 5,262,483
[45] Date of Patent: Nov. 16, 1993

[54] POLYMER COMPOSITION

[75] Inventor: Theophilus J. M. Jongeling, Weert, Netherlands

[73] Assignee: DSM N.V., Heerlen, Netherlands

[21] Appl. No.: 964,097

[22] Filed: Oct. 21, 1992

[30] Foreign Application Priority Data

Oct. 21, 1991 [NL] Netherlands .................. 9101750

[51] Int. Cl.$^5$ ................ C08L 35/06; C08L 25/08
[52] U.S. Cl. ................................. 525/185; 525/69
[58] Field of Search ......................... 525/185

[56] References Cited

U.S. PATENT DOCUMENTS

| | | | |
|---|---|---|---|
| 4,855,361 | 8/1989 | Yaniger et al. | 525/436 |
| 4,983,690 | 1/1991 | Cameron et al. | 525/436 |
| 5,160,457 | 11/1992 | Elsenbaumer | 252/518 |

FOREIGN PATENT DOCUMENTS 62-285953 12/1987 Japan.
01-069662 3/1989 Japan.
2-255770 10/1990 Japan.

OTHER PUBLICATIONS

Chemical Abstract 107:40763K (1987).
Chemical Abstract 114:123706q (1991).

Primary Examiner—James J. Seidleck
Assistant Examiner—I. Zemel
Attorney, Agent, or Firm—Cushman, Darby & Cushman

[57] ABSTRACT

The invention relates to a polymer composition of a thermoplastic polymer made of monomeric units containing dicarboxylic anhydride groups and a polyaniline grafted onto the thermoplastic polymer through the reaction of the terminal $NH_2$ group of the polyaniline with the dicarboxylic anhydride groups. The polymer composition has good thermoplastic processability as well as good conductive properties.

8 Claims, No Drawings

POLYMER COMPOSITION

The invention relates to a polymer composition based on a thermoplastic polymer and polyaniline.

Such a polymer composition is known from the Japanese patent JP-A-01069662. The polymer composition mentioned therein is obtained by mixing polyaniline powder into a thermoplastic polymer. The polymer composition thus obtained finds application in the electrical and electronic industries in particular.

A drawback of the known electrically conductive polymers, such as polyaniline and polymer compositions of such polymers with electrically conductive polymers, is that they cannot be processed thermoplastically. Electrically conductive polymers are obtained as powders in the synthesis. After the synthesis it is no longer possible to produce a homogeneous polymer composition from these electrically conductive polymers and other polymers. Instead of a homogeneous blend, a polymer composition is obtained that consists of a thermoplastic matrix in which polyaniline powder particles are dispersed.

A further drawback is that the dispersed powder particles do not constitute a continuous, conductive phase throughout the polymer composition, as a result of which the electrical conductivity of such a polymer composition is poor. The electrical conductivity of the polymer composition obtained with the process of the aforementioned patent is very poor, in spite of the fact that more than 60 wt. % electrically conductive polymer powder is added. In order to obtain a polymer composition with good electrical conductivity a very large amount of polyaniline powder has to be added to the polymer composition.

It has been found that it is not possible to obtain a polymer composition which has good thermoplastic processability as well as good conductive properties by mixing polyaniline powder into a thermoplastic polymer. This greatly limits the number of applications for polymer compositions containing polyaniline.

The aim of the present invention is to provide a polymer composition containing a thermoplastic polymer and polyaniline, which does not present the above drawbacks.

The polymer composition according to the invention is characterised in that the thermoplastic polymer contains functional monomeric units and the polyaniline is grafted onto the thermoplastic polymer substantially through the reaction of the terminal NH$_2$ group of the polyaniline with a functional monomeric unit of the thermoplastic polymer. It has been found that the polymer composition according to the invention has good thermoplastic processability and at the same time good conductive properties.

Polyaniline can be synthesized for example by causing aniline to polymerise under the influence of ammonium persulphate, (NH$_4$)$_2$S$_2$O$_8$, in an excess of a 1-molar HCl solution. The reaction product thus obtained, which is recovered as a blue-green powder, is polyaniline. Other processes are described by for example A. G. Green and A. E. Woodhead, 'Aniline-black and Allied Compounds, Part I', J. Chem. Soc., Vol. 101, p. 1117 (1912). Finally, a synthesis route that is often used today is described in Synthetic Metals by Andreatta et al., 26 (1988), pp. 383-389.

The polyaniline, whether or not substituted, may consist of one or more monomers from the group comprising 2-cyclohexylaniline, aniline, 4-propanoylaniline, 2-(methylamino)aniline, 2-(dimethylamine)aniline, o-toluidine, 4-carboxyaniline, n-methylaniline, m-hexylaniline, 2-methyl-4-methoxy-carbonylaniline, n-propylaniline, n-hexylaniline, m-toluidine, o-ethylaniline, m-ethylaniline, o-ethoxyaniline, m-butylaniline, 5-chloro-2-ethoxyaniline, m-octylaniline, 4-bromoaniline, 2-bromoaniline, 3-bromoaniline, 3-acetamidoaniline, 4-acetamidoaniline, 5-chloro-2-methoxyaniline, 2-acetylaniline, 2,5-dimethylaniline, 2,3-dimethylaniline, N,N-dimethylaniline, 4-benzylaniline, 4-aminoaniline, 2-methylthiomethylaniline, 4-(2,4-dimethylphenyl)aniline, 2-ethylthioaniline, n-methyl-2,4-dimethylaniline, n-propyl-m-toluidine, n-methyl-o-cyanoaniline, 2,5-dibutylaniline, 2,5-dimethoxyaniline, o-cyanoaniline, tetrahydronaphthylamine, 3-(n-butanesulphonic) aniline, 2-thiomethylaniline, 2,5-dichloroaniline, 2,4-dimethoxyaniline, 3-propoxymethylaniline, 4-mercaptoaniline, 4-methylthioaniline, 3-phenoxyaniline, 4-phenoxyaniline, n-hexyl-m-toluidine, 4-phenylthioaniline, n-octyl-m-toluidine and 4-trimethylsilylaniline. Preferably, aniline is used as monomer.

The molecular weight of the formed polyaniline—whether or not substituted—may vary within very wide limits in the context of the invention. The desired molecular weight (weight average, Mw) is dependent on the desired electrical conductivity. In general, the molecular weight will be between 500 and 150,000. Preferably, the molecular weight is between 2,000 and 20,000. The amount of polyaniline in the polymer composition is dependent on the desired application; it usually lies between 5 and 60 wt. %.

According to the present invention the polyaniline is grafted onto a thermoplastic polymer. This can be done by using as a starting material a thermoplastic polymer containing functional monomeric units that are reactive with the polyaniline, whether or not substituted. The polyaniline is grafted onto the thermoplastic polymer by the reaction of the terminal NH$_2$ groups present with the appropriate functional monomeric units of the thermoplastic polymer. However, it can not be excluded, that some imine-groups of the polyaniline react with the functional monomeric units as well, although this is not preferred. Preferably, the polyaniline contains not more than one NH$_2$ group per polymer chain because otherwise cross-linking may occur. Crosslinking is not desirable because it may involve loss of the thermoplastic processability.

The grafting process may take place in solution but grafting in the melt is also a good possibility. It is also possible to add a solution of polyaniline to the melt of the thermoplastic polymer.

An optimisation of the electrical conductivity on the one hand and of the mechanical properties on the other can be realized by varying the number of functional monomeric units in the thermoplastic polymer. The number of desired functional monomeric units in the thermoplastic polymer depends on the desired properties of the polymer composition finally obtained. The average person skilled in the art will know how to find the most suitable polymer for a specific application. In general, the number of functional monomeric units will be 1-50% of the total number of monomeric units constituting the thermoplastic polymer. Preferably, the number of functional monomeric units is between 10 and 35% of the total number of monomeric units.

The type of thermoplastic polymer is not of essential importance within the context of the present invention.

The average person skilled in the art will be able to easily make a choice on the basis of the desired thermal and mechanical properties of the polymer composition.

In view of the fact that the reactive group of the polyaniline is the terminal NH$_2$ group, the aforementioned functional monomeric units that are reactive with the polyaniline, whether or not substituted, are preferably α,β-unsaturated dicarboxylic anhydride groups. They are preferably chosen from the group comprising maleic anhydride, chloromaleic anhydride, dichloromaleic anhydride, citraconic anhydride, cyclohexylmaleic anhydride, benzylmaleic anhydride, itaconic anhydride, phenylmaleic anhydride, aconitic anhydride, propylmaleic anhydride and 1,2-diethylmaleic anhydride. Optionally, use may be made of mixtures of these monomeric units. Preferably, use is made of maleic anhydride.

As already indicated above, the type of thermoplastic polymer used is not of essential importance within the context of the present invention. Therefore this polymer may contain all conceivable monomeric units in addition to the functional monomeric units. These may be chosen from for example the group comprising ethylene, propylene, butadiene, styrene, α-methylstyrene, p-methylstyrene, maleimide (whether or not substituted), (meth)acrylates and combinations of several of these monomeric units. This list is however by no means restrictive.

Particularly preferable is a copolymer of a vinylaromatic monomer and an α,β-unsaturated dicarboxylic anhydride on account of its excellent compatibility with other polymers. Most preferable is a copolymer of styrene and maleic anhydride.

The polymer composition obtained may optionally be mixed with another suitable thermoplastic polymer so as to obtain a polymer blend having electrical conductivity. This other polymer is for example chosen from the group comprising acrylonitrile-butadiene-styrene terpolymers (ABS), polyamides, such as (nylon-4), (nylon-6), (nylon-7), (nylon-8), (nylon-9), (nylon-10), (nylon-11), (nylon-12), (nylon-4.6), (nylon-6.6), (nylon-7.7), (nylon-8.8), (nylon-6.10), (nylon-9.9), (nylon-10.9), (nylon-12.12) and (nylon-10.10), polyesters, such as poly(ethylene terephthalate) and poly(butylene)terephthalate, poly(p-phenylene terephthalamide), styrene-maleimide copolymers (SMI), polyolefines, such as polypropylene and polyethylene, styrene-maleic-anhydride copolymers, which may optionally be entirely or partly imided, polycarbonates (PC), polyimides, polyethers and polyacrylates, or a mixture of several of these polymers.

The mixing of the different polymers to the desired polymer blend can be done in the usual manner. In view of the simplicity of the process, it is preferable to mix the different polymers at a temperature that lies above the respective melting temperatures. The usual equipment may be used in the mixing process, for example a Brabender kneader or a single- or twin-screw extruder.

The usual additives and fillers may optionally be mixed into the polymer composition obtained. Examples are talcum, glass fibres, graphite fibres, graphite whiskers, steel fibres and other conductive or reinforcing fillers.

The conductive properties of the finally obtained graft copolymers and polymer compositions containing said graft copolymers are measured according to the so-called four-probe method. This method is briefly described in EP-A-314311. A more detailed description is to be found in H. H. Wieder, Laboratory Notes on Electrical and Galvanomagnetic Measurements, Elsevier, N.Y., 1979. This method is used to measure the specific conductivity:

$$\sigma = (L/A)^*(1/R),$$

where
  σ=the specific conductivity [S/cm],
  L=the distance between the two inside electrodes [cm],
  R=the resistance [Ohm],
  A=cross-sectional area [cm$^2$].

The present invention is elucidated with reference to the following examples without, however, being limited thereto.

Preparation of polyaniline

The polyaniline used in the examples was synthesized according to a standard formulation described in 'Synthetic Metals' by Andreatta et al., 26 (1988), pp. 383-389. The conductivity of the polyaniline thus synthesized was 0.4 S/cm.

A portion of the synthesized polyaniline (PANI) was dissolved in 97% sulphuric acid, after which the intrinsic viscosity of the solution obtained was determined. Then the weight average molecular weight ($M_w$) was determined with the aid of the Mark-Houwink equation; it was found to be 13,500.

Copolymer of styrene and maleic anhydride

A copolymer of styrene and maleic anhydride (SMA) was used as thermoplastic polymer. The reader is referred to Chapters 9 and 10 of 'Maleic Anhydride' by B. V. Trivedi and B. M. Culbertson, Plenum Press 1982, 1st edition, for a general preparation process for such copolymers. The SMA used here has a weight average molecular weight ($M_w$) of 110,000 and contains 28 wt. % maleic anhydride.

Preparation of solutions

In order to produce a graft copolymer of the synthesized polyaniline and the SMA, the two polymers were both dissolved in a suitable solvent. At a temperature of 20° C. polyaniline is slightly soluble in N-methylpyrrolidone (NMP). 10 g of polyaniline was rinsed with alternately 30 ml of 1-molar NH$_4$OH solution in water, water, 30 ml of 1-molar HCl solution in water and once again water so as to obtain a solution of 10 g per liter of NMP. Where necessary, this cycle was repeated several times (A). The intermediate rinsing with water was done until a pH of 7 was obtained. 1 g of the polyaniline thus treated was dissolved, with vigorous stirring, in 100 ml of NMP, to which 0.4 g of LiCl had also been added.

The copolymer of styrene and maleic anhydride appeared to dissolve well in NMP. In the examples use is made of a solution that contains 10 wt. % SMA.

EXAMPLES I THROUGH VI

The production of a graft copolymer of polyaniline on SMA

The solutions of polyaniline and SMA thus obtained were mixed in the indicated ratios. Then the mixture was heated for a short time ($t_1$), with stirring, at a temperature $T_1$. After the mixture had been heated it was poured into a solution of HCl in water. The graft copolymer thus obtained then formed a deposit. The intensity of the green colour of the deposit depended on the amount of polyaniline present. After filtering through a Büchner funnel and drying in a vacuum stove a green powder was obtained. Table 1 shows the experimental data and the results of examples I–VI.

TABLE 1

Experimental data and results

| Ex. | parts by weight PANI | parts by weight SMA | $t_1$ (min) | $T_1$ | A (°C.) | $T_g$ (°C.) | $\sigma$ (S/cm) |
|---|---|---|---|---|---|---|---|
| I   | 10 | 90 | 5  | 170 | 1 | 140 | $1.1\ 10^{-2}$ |
| II  | 10 | 90 | 5  | 170 | 1 | 141 | $2.2\ 10^{-1}$ |
| III | 20 | 80 | 5  | 170 | 1 | 136 | $5.8\ 10^{-3}$ |
| IV  | 30 | 70 | 2  | 170 | 1 | 147 | $7.9\ 10^{-3}$ |
| V   | 30 | 70 | 7  | 171 | 1 | 141 | $4.6\ 10^{-2}$ |
| VI  | 50 | 50 | 12 | 165 | 5 | 136 | $4.0\ 10^{-3}$ |

Then the polymer compositions produced in experiments I–VI were subjected to processing experiments. To this end the obtained powder was processed using a twin-screw extruder (processing temperature 230° C., 100 rpm, residence time 5–8 minutes). It appeared to be possible to extrude green, homogeneously coloured, strands.

EXAMPLES VII–IX

Production of polymer compositions

The obtained polymer compositions were mixed with other polymers. In examples VII–IX polymer compositions were prepared of several graft copolymers obtained and a copolymer of styrene and maleic anhydride (SMA, molar weight 110,000, 28 wt. % maleic anhydride).

EXAMPLE VII 0.23 g of the graft polymer obtained in example V was blended with 50 g of SMA copolymer (molar weight 110,000, 28 wt. % maleic anhydride). This was done by kneading the two polymers for 5 minutes in a 50-g Brabender kneader at a temperature of 220° C. and 100 rpm. After blending a homogeneous, green polymer composition was obtained.

EXAMPLE VIII 30 parts by weight polyaniline and 70 parts by weight SMA were heated at a temperature of 170° C. for 10 minutes, with stirring. After filtration and drying a green powder was obtained, which was found to have a $T_g$ of 129° C. 0.50 g of the graft copolymer thus obtained was blended with 50 g of styrene-maleic-anhydride copolymer. This was done by kneading the two polymers in a 50-g Brabender kneader for 19 minutes at a temperature of 230° C. and 100 rpm. 1.5 g of boric acid was added in the last two minutes as a dope for the polyaniline present. After blending a homogeneous, green polymer composition was obtained.

EXAMPLE IX 10 g of the graft copolymer obtained in example III was mixed with the same amount of SMA in a (2.5-g) twinscrew extruder. In this way green extruded strands were obtained. The specific conductivity of the product obtained was $1.0\ 10^{-4}$ S/cm.

The examples show that the polymer compositions according to the invention can be processed thermoplastically. It is also apparent that the polymer compositions obtained have good electrical conductivity.

I claim:

1. Polymer composition comprising:
    a thermoplastic polymer comprising monomeric units containing dicarboxylic anhydride groups; and
    a polyaniline grafted onto the thermoplastic polymer substantially through the reaction of the terminal $NH_2$ group of the polyaniline with the dicarboxylic anhydride groups.

2. Polymer composition according to claim 1, characterised in that the thermoplastic polymer is a copolymer of an $\alpha,\beta$-unsaturated dicarboxylic anhydride and a vinylaromatic monomer.

3. Polymer composition according to claim 2, characterised in that the $\alpha,\beta$-unsaturated dicarboxylic anhydride is maleic anhydride.

4. Polymer composition according to claim 3, characterised in that the vinylaromatic monomer is styrene, $\alpha$-methylstyrene or a mixture thereof.

5. Polymer composition according to claim 3, characterised in that the number of maleic anhydride units is 1–50 mol. % of the total number of units constituting the thermoplastic polymer.

6. Polymer composition according to claim 5, characterised in that the weight average molecular weight ($M_w$) of the polyaniline is between 5,000 and 100,000.

7. Polymer composition according to claim 6, characterised in that the weight average molecular weight ($M_w$) of the polyaniline is between 8,000 and 20,000.

8. Objects entirely or partially produced from a polymer composition accordingly to claim 1.

* * * * *